(No Model.)  2 Sheets—Sheet 1.
A. A. BENNETT.
FAUCET.
No. 291,135.  Patented Jan. 1, 1884.
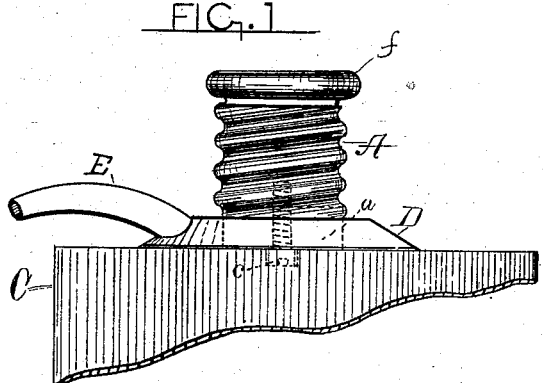
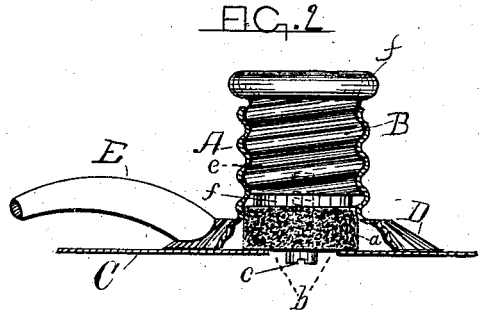
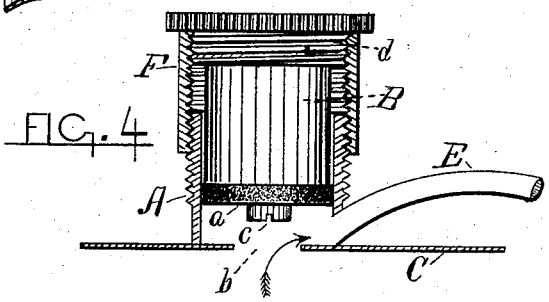
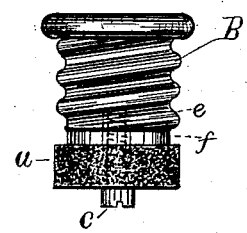
Witnesses:
Hermann Gauss
Rudolph Kost
Inventor:
Anthony A. Bennett
Per Geo. D. Phillips.

(No Model.) 2 Sheets—Sheet 2.

A. A BENNETT.
FAUCET.

No. 291,135. Patented Jan. 1, 1884.

Witnesses.
James Rounds.
Timothy P. Callahan.

Inventor.
Anthony A. Bennett.

By Geo. D. Phillips
atty.

UNITED STATES PATENT OFFICE.

ANTHONY A. BENNETT, OF WEST STRATFORD, CONNECTICUT.

FAUCET.

SPECIFICATION forming part of Letters Patent No. 291,135, dated January 1, 1884.

Application filed July 5, 1881. (No model.)

*To all whom it may concern:*

Be it known that I, ANTHONY A. BENNETT, of West Stratford, county of Fairfield, and State of Connecticut, have invented a certain new and useful Improvement in Faucets for Liquids; and I do hereby declare that the following is a full, clear, and exact description of my invention, which will enable others skilled in the art to which it appertains to make and use the same.

My invention relates to an improvement in faucets for cans, barrels, &c., but is more especially intended to be applied to cans for holding and transporting kerosene-oil, and is constructed to operate as a combined receiving and discharging faucet.

My invention consists of a plug fitting a threaded open-mouth tube or shell, and attached to the bottom of the plug is a packing-disk, of leather, rubber, or other soft yielding material, which is forced by the plug firmly down upon and covering the aperture in the can, and effectually preventing the escape or leakage of oil or other liquids. The inner walls of the tube being of equal diameter its whole length, the plug can be removed and the can refilled when necessary.

To more clearly understand my invention, reference is had to the drawings accompanying this specification and forming part thereof, in which—

Figure 1 is a view of my improved faucet. A is the threaded tube or shell. B is a threaded plug fitting therein. C is a section of a can. D is a disk or base provided for the tube or shell A, and is attached to the can C. E is the discharging-nozzle attached to the disk or base D.

Fig. 2 is a sectional view of Fig. 1, showing the interior of the disk D. *a* is the packing-disk covering the hole *b* of the can C, and is attached to the plug B by the screw *c*.

Fig. 3 represents a view of the plug B removed from the tube or shell A.

Fig. 4 is a sectional view representing the tube or shell A constructed of thicker material, threaded on the outside, and having a smooth interior. The tube or shell A is surmounted by the threaded cap F, which engages with the thread of the tube A. The plug B, having the packing-disk *a*, is provided at its upper end with the head or enlarged part *d*, and is secured to the bottom of the cap F.

Figure 5:
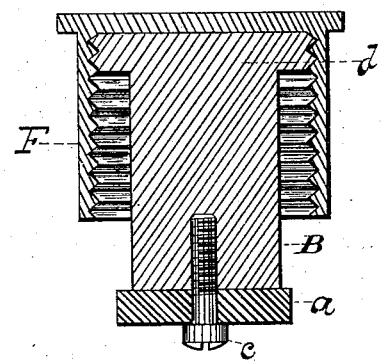
Figure 6:
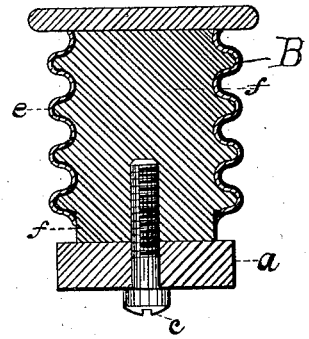

Figs. 5 and 6 are sectional views of the plug.

Its construction and operation are as follows: The tube or shell A, Figs. 1 and 2, is constructed of thin sheet metal, and is attached to the base D, which is soldered over the aperture *b* of the can C. The tube or shell A could be attached directly to the can; but the base D forms a very convenient support for the nozzle E. The plug B, Fig. 3, has a corresponding thread fitting the shell A, and may be constructed solid, of either wood or metal, or, as represented, having the sheet-metal spun thread *e* attached to the threaded center piece, *f*, of wood, to which is also attached the packing-disk *a* by the screw *c*; and when required to discharge the contents of the can all that is necessary is to turn the plug B, which lifts the packing-disk from its seat. The valve *a*, constructed of rubber, leather, or felt—preferably of felt—presses firmly against the inner walls of the tube or shell A, and prevents the escape of the liquid from the top of the tube or shell A.

Fig. 4 has the inner walls of the tube or shell A smooth and a thread cut on the outside. The plug B, preferably made of wood, to which is secured the packing-disk *a*, has an enlarged head, *d*, which is screwed into the cap F and down to the bottom sufficiently firm to prevent its getting loose. The tube or shell A, having threaded outer diameter, fits corresponding threads of the inner diameter of the cap F. The operation of Fig. 4 is the same as Figs. 1 and 2. Unscrewing the cap F lifts the packing-disk *a* from its seat, and permits the liquid to escape through the nozzle E, as indicated by the arrow. Fig. 4 also represents the faucet attached directly to the can C, the base D being dispensed with.

Having thus described my invention, what I claim as new, and desire to secure by Letters Patent, is—

In a faucet, the combination, with the threaded nozzle A and threaded plug B, of the threaded center piece, *f*, having the elastic packing-disk *a* secured to its lower end, substantially as described, and for the purpose as set forth.

In testimony that I claim the foregoing I have set my hand in the presence of two subscribing witnesses.

A. A. BENNETT.

Witnesses:
 HERMAN GAUSS,
 RUDOLPH KOST.